(12) United States Patent
Falco et al.

(10) Patent No.: US 12,386,807 B2
(45) Date of Patent: Aug. 12, 2025

(54) SYSTEM AND METHOD IMPLEMENTING A DISTRIBUTED AUDIT TRAIL

(71) Applicants: The Board of Trustees of the Leland Stanford Junior University, Stanford, CA (US); Board of Trustees of Michigan State University, East Lansing, MI (US)

(72) Inventors: Gregory Falco, Stanford, CA (US); Joshua Siegel, Novi, MI (US)

(73) Assignees: The Board of Trustees of the Leland Stanford Junior University, Stanford, CA (US); Board of Trustees of Michigan State University, East Lansing, MI (US)

( * ) Notice: Subject to any disclaimer, the term of this patent is extended or adjusted under 35 U.S.C. 154(b) by 516 days.

(21) Appl. No.: 17/450,035

(22) Filed: Oct. 5, 2021

(65) Prior Publication Data
US 2022/0107929 A1    Apr. 7, 2022

Related U.S. Application Data

(60) Provisional application No. 63/088,206, filed on Oct. 6, 2020.

(51) Int. Cl.
*G06F 16/22*    (2019.01)
*B60R 16/023*   (2006.01)
(Continued)

(52) U.S. Cl.
CPC ........ *G06F 16/2255* (2019.01); *B60R 16/023* (2013.01); *G06F 8/656* (2018.02); *G06F 11/1008* (2013.01); *G06F 16/27* (2019.01)

(58) Field of Classification Search
None
See application file for complete search history.

(56) References Cited

U.S. PATENT DOCUMENTS 9,948,760 B2    4/2018  Porembski
10,447,483 B1 * 10/2019  Su ..................... H04L 9/3226
(Continued)

OTHER PUBLICATIONS

NPL1-Dorri_Dec17: Dorri et al, "BlockChain: A Distributed Solution to Automotive Security and Privacy", Dec. 2017 (Year: 2017).*
(Continued)

*Primary Examiner* — Aleksandr Kerzhner
*Assistant Examiner* — Anugeetha Kunjithapatham
(74) *Attorney, Agent, or Firm* — KPPB LLP

(57) ABSTRACT

Various disclosed embodiments pertain to a distributed audit trail system for use in a connected system including: a master unit to control a first aspect of the connected system and to create a blockchain light client and a distributed hash table (DHT); a first node to control a second aspect of the connected system; a second node to control a third aspect of the connected system; and one or more remote servers to form a blockchain full node, where the master unit, the first node, and the second node electronically communicate with each other through the DHT in order to form a combined audit trail, where the master unit creates a meta-hash of the software version of the software in the master unit, the first node, and the second node, system identification data, system sensor data, and system hardware configuration.

18 Claims, 8 Drawing Sheets

(51) Int. Cl.
  *G06F 8/656* (2018.01)
  *G06F 11/10* (2006.01)
  *G06F 16/27* (2019.01)

(56) References Cited

U.S. PATENT DOCUMENTS

| | | | | |
|---|---|---|---|---|
| 2017/0352012 | A1* | 12/2017 | Hearn | G06Q 20/382 |
| 2018/0018723 | A1* | 1/2018 | Nagla | H04L 63/102 |
| 2018/0089256 | A1* | 3/2018 | Wright, Sr. | G06Q 20/1235 |
| 2018/0152516 | A1 | 5/2018 | Bestler et al. | |
| 2019/0258251 | A1 | 8/2019 | Ditty et al. | |
| 2020/0126324 | A1 | 4/2020 | Hutchins et al. | |
| 2020/0344074 | A1* | 10/2020 | Främling | H04L 63/123 |
| 2020/0412524 | A1* | 12/2020 | Das | G06F 16/1824 |
| 2022/0147337 | A1* | 5/2022 | Michelsohn | H04L 67/34 |
| 2022/0194400 | A1* | 6/2022 | Gee | G06V 10/82 |
| 2023/0005304 | A1* | 1/2023 | Skaggs | G07C 5/008 |

OTHER PUBLICATIONS

NPL2-Dorri_Apr17: Dorri et al, "Towards an Optimized BlockChain for IoT", Apr. 2017 (Year: 2017).*
NPL3-Miller: Miller et al, "Remote Exploitation of an Unaltered Passenger Vehicle", Aug. 2015 (Year: 2015).*
NPL4-Siegel: "CloudThink and the Avacar: Embedded Design to Create Virtual Vehicles for Cloud-Based Informatics, Telematics, and Infotainment", Jun. 2013 (Year: 2013).*
NPL5-Steger_AutoUpdatesBlockchain-2018: Steger et al, , "Secure Wireless Automotive Software Updates Using Blockchains: A Proof of Concept", 2018 (Year: 2018).*
Alam, "Securing Vehicle Electronic Control Unit (ECU) Communications and Stored Data", Thesis, Jun. 2019, 95 pgs.
Brousmiche et al., "Digitizing, Securing and Sharing Vehicles Life-cycle over a Consortium Blockchain: Lessons Learned", Conference: 2018 9th IFIP International Conference on New Technologies, Mobility and Security (NTMS), Feb. 2018, pp. 1-6, doi: 10.1109/NTMS.2018.8328733.
Cebe et al., "Block4Forensic: An Integrated Lightweight Blockchain Framework for Forensics Applications of Connected Vehicles", IEEE Communications Magazine, vol. 56, No. 10, Oct. 2018, pp. 50-57, doi: 10.1109/MCOM.2018.1800137.
Chanson et al., "Blockchain as a Privacy Enabler: an Odometer Fraud Prevention System", Conference: the 2017 ACM International Joint Conference on Pervasive and Ubiquitous Computing and the 2017 ACM International Symposium on Wearable Computers, Sep. 2017, pp. 13-16, doi: 10.1145/3123024.3123078.
Cyber Physical Systems, "Framework for Cyber-Physical Systems", CPS PWG Draft Framework for Cyber-Physical Systems, Release 1.0, May 2016, 266 pgs.
Falco et al., "Cyber risk research impeded by disciplinary barriers", Science, vol. 366, No. 6469, Nov. 2019, pp. 1066-1069, doi: 10.1126/science.aaz4795.
Falco et al., "NeuroMesh: IoT Security Enabled by a Blockchain Powered Botnet Vaccine", Proceedings of the International conference on Omni-Layer Intelligent System, ACM, 2019, 6 pgs., doi: 10.1145/3312614.3312615.
Fraga-Lamas et al., "A Review on Blockchain Technologies for an Advanced and Cyber-Resilient Automotive Industry", IEEE Access, vol. 7, Jan. 2019, pp. 17578-17598, doi: 10.1109/ACCESS.2019. 2895302.
Grossi, "Aviation Recorder Overview", International Symposium on Transportation Recorders, 1999, 12 pgs.
Halder et al., "Secure OTA Software Updates in Connected Vehicles: A Survey", Computer Networks, vol. 178, 107343, arXiv preprint: 1904.00685 [cs.CR], Apr. 1, 2019, pp. 1-18, doi: 10.1016/j.comnet. 2020.107343.
Hong et al., "EdiSense: A Replicated Datastore for IoT Data", Stanford University, 2014, 6 pgs.
Ihs Markit, "Vehicles Getting Older: Average of Light Cars and Trucks in US Rises Again in 2016 to 11.6 Years, IHS Markit Says", Press Release, Businesswire, Nov. 22, 2016, 2 pgs.
Kent et al., "Assuring Vehicle Update Integrity Using Asymmetric Public Key Infrastructure (PKI) and Public Key Cryptography (PKC)", Sae International Journal of Transportation Cybersecurity and Privacy, Aug. 2020, vol. 2, No. 2, 10 pgs., DOI: 10.4271/11-02-02-0013.
Koebler, "Why American Farmers are hacking their tractors with Ukrainian firmware", Motherboard, Retrieved from "<https://www.vice.com/en/article/xykkkd/why-american-farmers-are-hacking-their-tractors-with-ukrainian-firmware>" Accessed, on Jun. 18, 2024, Published on Mar. 22, 2017, 7 pgs.
Malik et al., "Blockchain Based Secured Identity Authentication and Expeditious Revocation Framework for Vehicular Networks", 17th IEEE International Conference on Trust, Security and Privacy in Computing and Communications/12th IEEE International Conference on Big Data Science and Engineering, 2018, pp. 674-679, doi: 10.1109/TrustCom/BigDataSE.2018.00099.
Moinet et al., "Blockchain based trust & authentication for decentralized sensor networks", arXiv:1706.01730 [cs.CR], Jun. 6, 2017, 6 pgs.
Nie et al., "Free-Fall: Hacking Tesla from Wireless to Can Bus", Briefing, blackhat, 2017, pp. 1-16.
Ortega et al., "Blockchains and Content-Centric Networking for Trusted 5G Vehicular Networks", IEEE Vehicular Technology Magazine, vol. 13, No. 2, Apr. 20, 2018, pp. 121-127, doi: 10.1109/MVT. 2018.2813422.
Perez et al., "Argos: An Advanced Invehicle Data Recorder on a Massively Sensorized Vehicle for Car Driver Behavior Experimentation", IEEE Transactions on Intelligent Transportation Systems, vol. 11, No. 2, 2010, pp. 463-473, doi: 10.1109/TITS.2010. 2046323.
Reilly et al., "A Smart City IoT Integrity-First Communication Protocol via an Ethereum Blockchain Light Client", Proceedings of the International Workshop of Software Engineering Research and Practices for the Internet on Things (SERP4IoT), 2019, 4 pgs., doi: 10.1109/SERP4IoT.2019.00016.
Salem et al., "Security Approach for In-Vehicle Networking Using Blockchain Technology", Nutzwertanalysen in Marketing und Vertrieb, Feb. 2019, pp. 504-515, doi: 10.1007/978-3-030-12839-5_47.
Siegel et al., "A Survey of the Connected Vehicle Landscape-Architectures, Enabling Technologies, Applications, and Development Areas", IEEE Transactions on Intelligent Transportation Systems, vol. 19, No. 8, Aug. 2018, pp. 2391-2406, doi: 10.1109/TITS. 2017.2749459.
Siegel et al., "Algorithms And Architectures: A Case Study in When, Where and How to Connect Vehicles", Intelligent Transportation Systems Magazine, Spring 2018, vol. 10, pp. 74-87.
Singh et al., "Branch based blockchain technology in intelligent vehicle", Computer Networks, vol. 145, Nov. 9, 2018, pp. 219-231, doi: 10.1016/j.comnet.2018.08.016.
Suo et al., "Driving Data Dissemination: The "Terms" Governing Connected Car Information", IEEE Intelligent Transportation Systems Magazine (to appear, 2020), Spring 2021, vol. 13, No. 1, Dec. 11, 2020, pp. 20-30, doi: 10.1109/MITS.2020.3037315.
Urdaneta et al., "A survey of DHT security techniques", Computer Science, ACM Computing Surveys (CSUR), vol. 43, No. 2, 2011, 53 pgs., doi: 10.1145/1883612.1883615.
White et al., "Black Block Recorder: Immutable Black Box Logging for Robots via Blockchain", IEEE Journal on Robotics and Automation, vol. 4, No. 4, Jul. 2019, pp. 3812-3819, doi: 10.1109/ LRA.2019.2928780.
Winfield et al., "The Case for an Ethical Black Box", Lecture Notes in Computer Science, Conference: Towards Autonomous Robotic Systems, Surrey, Springer LNAI vol. 10454, Jul. 2017, pp. 262-273, doi: 10.1007/978-3- 319-64107-2_21.
Wortham et al., "Robot Transparency: Improving Understanding of Intelligent Behaviour for Designers and Users", Annual Conference Towards Autonomous Robotic Systems, Jul. 2017, pp. 274-289, doi: 10.1007/978-3-319-64107-2_22.

(56) References Cited

OTHER PUBLICATIONS

Yao et al., "The Smart Black Box: A Value-Driven High-Bandwidth Automotive Event Data Recorder", IEEE Transactions on Intelligent Transportation Systems, Feb. 2020, pp. 1-13, arXiv:1903.01450, Mar. 4, 2019.

* cited by examiner

SYSTEM AND METHOD IMPLEMENTING A DISTRIBUTED AUDIT TRAIL

CROSS-REFERENCE TO RELATED APPLICATIONS

The current application is a continuation of U.S. Patent Application No. 63/088,206, entitled "Distributed Black Box Audit Trail Design for Connected and Automated Vehicle Data and Software Assurance" to Falco et al., filed Oct. 6, 2020, the disclosure of which is incorporated herein by reference in its entirety.

FIELD OF THE INVENTION

The present invention generally relates to a distributed audit trail system for use in a connected system.

BACKGROUND OF THE INVENTION

Systems may include various sub-modules which communicate with each other. These sub-modules may be connected to one or more servers where over-the-air updates may be provided. A head module may be used to link various sub-modules to the one or more servers. For example, vehicles may include a growing volume of software and number of sensors, actuators, compute modules, and intra- and extra-vehicular networks dedicated to enhancing vehicle performance, safety, reliability, and efficiency.

While automotive hardware is typically immutable, recently, software upgrades—whether dealership-installed or over-the-air updates—have begun to enhance and enable features within an extant fleet. Today, software controls critical vehicle functions including Advanced Driver Assistance Systems (ADAS) and highly-automated driving. These applications are trained and tested for safety on particular vehicles, with software variants designed for specific hardware configurations, operator use cases, or even tailored to individual drivers' behavior. Because this software is both highly varied and safety-critical, it may be beneficial to assure software provenance, integrity, and immutability to ensure that the proper versions are installed. Having the correct software may be beneficial in order to assure that the overall system performs as-designed.

Sensors, actuators, and vehicle-specific configuration and persistent state data are similarly sensitive to intentional and incidental data interference. Sensor messages and actuation requests may be spoofed, causing local system failure—or, in the case of a connected vehicle, the misbehavior of a larger transportation network. The risk of large-scale failure is significant, with 75% of new vehicles expected to be connected by 2020. Data shared car-to car might be used to automate braking, or to reroute vehicles to avoid a traffic jam, and while verified data may stabilize traffic and reduce accidents, "bad" data may lead to the converse. These software and data integrity challenges are complicated by new business models such as shared mobility, wherein vehicles may be exposed to untrustworthy individuals and potentially-skilled adversaries.

BRIEF SUMMARY OF THE INVENTION

Various embodiments are directed to a distributed audit trail system for use in a connected system including: a master unit including software executable to control a first aspect of the connected system and including programming executable to create a blockchain light client and a distributed hash table (DHT); a first node including software executable to control a second aspect of the connected system; a second node including software executable to control a third aspect of the connected system; and one or more remote servers each including one or more processors and memory with programming executable to form a blockchain full node, where the master unit, the first node, and the second node electronically communicate with each other through the DHT in order to form a combined audit trail, where the master unit further includes programming executable to create a meta-hash of an element selective from the group consisting of the software version of the software in the master unit, the first node, and the second node, system identification data, system sensor data, and system hardware configuration, where the master unit through the blockchain light client delivers the meta-hash to the blockchain full node, and where the memory of the one or more remote servers further includes programming which performs a check of the meta-hash which compares the meta-hash to a stored library of acceptable and safe meta-hashes.

Various other embodiments are directed to a vehicle including a distributed audit trail including: the distributed audit trail system described above, where each of the master unit, the first node, and the second node is an element selected from an infotainment system, an engine control unit, a body control module, and/or a transmission control module, where the master unit, the first node, and the second node are all different elements.

In various other embodiments, the memory of the one or more remote servers further includes programming configured to perform, when the check indicates a mismatch between the meta-hash and the library of acceptable and safe meta-hashes, at least one of: sending a notification to a service provider; performing an over-the-air update to the system software; or immobilizing the connected system until software is manually reinstalled.

In still various other embodiments, the distributed audit trail system further includes a third node including software executable to control a fourth aspect of the system and where the third node electronically communicates with the master unit through the DHT in order to form the combined audit trail.

In still various other embodiments, the distributed audit trail system further includes a parity node configured to partially replicate a portion of the DHT stored in the master unit, the first node, and the second node.

In still various other embodiments, the parity node includes an infotainment system, an engine control unit, a body control module, or a transmission control module.

In still various other embodiments, the master unit, the first node, the second node, and the parity node make up a parity system configured to detect and correct corruption in case the master unit, the first node, the second node, or the parity node fails.

In still various other embodiments, various data in the DHT within the master unit, the first node, the second node, or the parity node are duplicated within the other units of the master unit, the first node, the second node, and the parity node.

In still various other embodiments, the master unit is an infotainment system which is configured to directly communicate with the first node and the second node.

Various other embodiments are directed to a method of operating a master unit to create a distributed audit trail system for use in a connected system, the method including: communicating with a first node, a second node, and one or more remote servers; creating a blockchain light client and distributed hash table (DHT); communicating with the first node and the second node through the DHT to form a combined audit trail; creating a meta-hash of the software version of the software in the master unit, the first node, and the second node, system identification data, system sensor data, and/or system hardware configuration; and delivering the meta-hash to a blockchain full node on the one or more servers.

In various other embodiments, the method further includes receiving an indication of a mismatch between the meta-hash and a library of acceptable and safe meta-hashes.

In still various other embodiments, the method further includes, in response to the indication of the mismatch, receiving an over-the-air update to the software in the master unit, the first node, and/or the second node.

In still various other embodiments, the method further includes, in response to the indication of the mismatch, immobilizing the connected system.

In still various other embodiments, each of the master unit, the first node, and the second node is at least one of an infotainment system, an engine control unit, a body control module, and/or a transmission control module, where the master unit, the first node, and the second node are all different elements.

In still various other embodiments, the method further includes communicating with a third node through the DHT to form the combined audit trail.

In still various other embodiments, the master unit controls a first aspect of the connected system, the first node controls a second aspect of the connected system, the second node controls a third aspect of the connected system.

In still various other embodiments, the method further includes communicating with a parity node configured to partially replicate a portion of the DHT stored in the master unit, the first node, and the second node.

In still various other embodiments, the parity node includes an infotainment system, an engine control unit, a body control module, or a transmission control module.

In still various other embodiments, the master unit, the first node, the second node, and the parity node make up a parity system configured to detect and correct corruption in case the master unit, the first node, the second node, or the parity node fails.

In still various other embodiments, various data in the DHT within the master unit, the first node, the second node, or the parity node are duplicated within the other units of the master unit, the first node, the second node, and the parity node.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Figure 1:
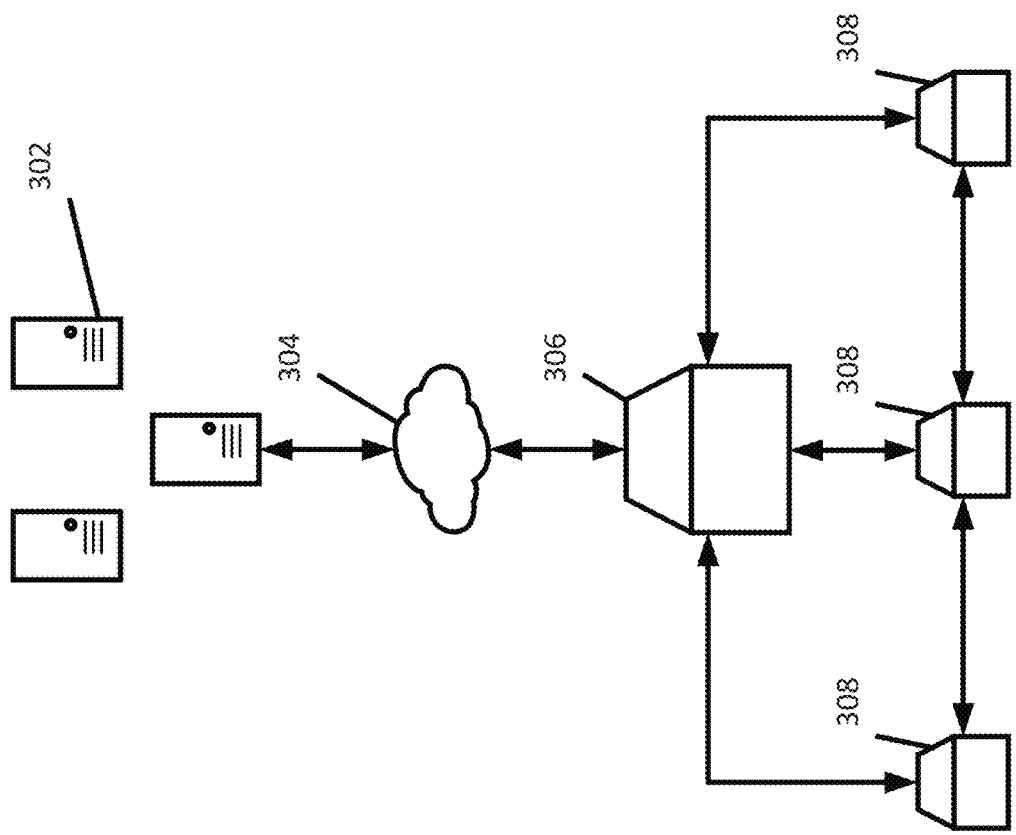
FIG. 1 illustrates a schematic of a distributed black box system in accordance with an embodiment of the invention.

This disclosure relates to a method for tracking and validating critical persistent and semi-permanent data (e.g. vehicle configuration parameters, identifiers, and odometry metrics stored within EEPROM) and software (version and variant data and update history) within systems such as vehicles. Various embodiments resemble the audit trail functionality found in a flight data recorder (FDR) or 'black box', but distributed and layered in nature. Distribution may provide resilience in the case of an attack on or malfunction of system components (e.g. vehicular components). Various embodiments are resource-efficient with respect to in-car computing and network-loading constraints to ensure scalability and compatibility with the incumbent vehicle fleet. Various embodiments assure integrity of sensor readings and actuator commands in addition to providing software version control and configuration assurance. Broader shifts in security culture may accompany any technological solution, and that the disclosed embodiments may not be a comprehensive solution for assuring vehicle security rather, it may be complementary to the larger security focus.

In-vehicle data recorders (IVDR) for highly automated systems and robotics have been used in the past. However, past IVDR do not present a distributed black box. For time-of-production version control, OEMs often utilize networked databases to record hardware and software metadata for the initially-installed payload. Similarly, OEMs may run online, internet-enabled programming services to better-control access to software and to allow for the creation of a database, which maps software versions to vehicle identification numbers and associated configuration data.

During programming events, the software may modify memory on multiple electronic control units as a form of distributed ledger—that is, the radio, engine controller, and instrument panel computer may all store common metadata such as software version, vehicle identification, airbag status or crash data, and mileage, to make code modification more difficult by requiring simultaneous manipulation.

This approach may be vulnerable to two common attacks: the first is EEPROM modification, wherein data is modified directly on one or more device's memory with the battery removed. The second is through "official" programming mechanisms, such as Universal Diagnostic Services or J2534 reprogramming, but with users directly modifying memory addresses or using offline and/or cracked software to modify otherwise "protected" memory. With this type of reprogramming, many modules will not register a software-change event, meaning the installed code and the on-device metadata may reflect different versions, leading to a false sense of security and/or poor interoperation.

In some embodiments, to enhance the protection of module programming and of critical memory, blockchains may be used to secure elements of vehicle software, data, and communications. For example, blockchains may be used to secure and validate software updates, to secure odometer readings and vehicle identification, and for credential management, data management, and vehicle authentication. In some embodiments, blockchains may also be used to store and secure vehicle lifecycle data, service records, and accident histories and reconstruction from supply chain through end-of-life. In some implementations, vehicles mine blocks themselves, and region-bounded ledgers may be used. In some embodiments, in-vehicle blockchains can be used.

In general, certain embodiments may use a heavy-weight blockchain implementation. While this may be suitable for expensive and purpose-built shared vehicles, which amortize up-front costs across a larger number of rides, such embodiments may be incapable of running on constrained hardware present in the incumbent vehicle fleet. It would be beneficial to have the ability to store these data at large scale without using significant computational overhead for the embedded devices themselves.

Distributed black boxes in accordance with various embodiments of the invention can implement a lightweight Distributed Hash Table (DHT) and networked datastores that utilize consensus voting to validate data to log any sensitive data or software change event, such as (but not limited to) updates to software version, variant, changes to vehicle identification data, and/or significant events including major increments of vehicle miles travelled. In some embodiments, in high-assurance systems, DHT content can be backed up by a parity system so that critical data may not be lost should an embedded device, inter- or intra-vehicular network, or memory module fail. Multiple DHT nodes can regularly feed information into a blockchain that may be queried by an OEM without having to ping multiple nodes of the DHT to access routing tables. In a number of embodiments, disclosed distributed black boxes may be hardware- and communications-agnostic and capable of running within the hardware and network constraints imposed by a "typical" modern vehicle context, including limitations brought about by the use of cost-efficient embedded systems with constrained computation, memory, and connectivity.

Distributed black boxes in accordance with several embodiments of the invention may be generalized to other embedded and constrained systems, and extended to other types of data (e.g. environmental context data to better understand accidents, sensor or actuator data for keyframe validation, or as part of a proof-of-location system). Distributed black boxes may also be implemented at the dealership- and OEM-level to create a record of fleet-wide software installations to support and improve warranty claim handling, service records, and to provide data useful for insurers, law enforcement, fleet managers, and component suppliers.

In some embodiments, distributed black boxes can enable an audit trail of software changes and data modification and may include many beneficial properties (e.g. resilient software design, end-to-end communication encryption, etc.) that can collectively enable assurance for complex cyber-physical systems such as connected and automated vehicles. Standards such as ISO 26262 and NIST's CyberPhysical Systems Framework offer more comprehensive guidance for improving the security of embedded systems.

FIG. 1 illustrates a schematic of a distributed black box system in accordance with an embodiment of the invention. The distributed black box system includes a master unit 306 including software executable to control a first aspect of a connected system and including software executable to create a blockchain light client and a DHT. The distributed black box system includes a plurality of nodes 308 which may include a first node and a second node. The first node includes software executable to control a second aspect of the connected system and the second node includes software executable to control a third aspect of the connected system. As illustrated, the plurality of nodes 308 may include three nodes. In some embodiments, the plurality of nodes 308 may include more than three nodes. The distributed black box system further includes one or more remote servers 302. While three remote servers are illustrated, there may be more or less remote servers.

The remote servers 302 may include one or more processors and memory with programming executable to form a blockchain full node. The remote servers 302 communicate with the master unit 306. For example, the remote servers 302 may communicate with the master unit 306 through the internet 304. The master unit 306 and the plurality of nodes 308 electronically communicate with each other through the DHT in order to store a combined audit trail. The master unit 306 further includes programming executable to create a meta-hash of at least one of the software version of the software in the master unit, the first node, and the second node, system identification data, system sensor data, or system hardware configuration. The master unit 306 through the blockchain light client delivers the meta-hash to the blockchain full node in the remote servers 302.

The DHT may be a distributed data storage mechanism. The blockchain light client is a blockchain client with reduced features and capabilities when compared to the blockchain full node. The blockchain light client has a lessened resource requirement when compared to the blockchain full node. For example, while the blockchain light client still verify transactions, they store less information than the blockchain full node and might not be involved with transactions occurring in the blockchain full node. The blockchain light client stores a full copy of the audit trail across the vehicle's components and may, in pre-determined intervals, offloads this data to the blockchain full node. The blockchain full node may be operated by the OEM. The OEM can then have access to audit trails across all of their vehicles' audit trails. The blockchain light client is used as an aggregator across the master unit 306 and the plurality of nodes 308 collecting the logs across each in a given vehicle, and then reporting these back to the blockchain full node.

The memory of the one or more remote servers 302 further includes programming which performs a check of the meta-hash which compares the meta-hash to a stored library of acceptable and safe meta-hashes.

In some embodiments, distributed black boxes may be implemented as automotive software. Automotive software is increasingly complex and critical to safe vehicle operation, and related embedded systems would benefit from remaining up-to-date to ensure long-term system performance. Update mechanisms and data modification tools may introduce opportunities for malicious actors to compromise these cyber-physical systems, and for trusted actors to mistakenly install incompatible software versions. A distributed and stratified "black box" audit trail for automotive software and data provenance may assure users, service providers, and original equipment manufacturers (OEMs) of vehicular software integrity and reliability. In some embodiments, black box architectures can be both layered and diffuse, employing distributed hash tables (DHT), a parity system and/or a public blockchain to provide high resilience, assurance, scalability, and efficiency for automotive and other high-assurance systems.

In some examples, a vehicle might feature hundreds of sensors, dozens of low-to-mid-power embedded compute modules locally controlling various functions, and one or two higher-power computers interconnected by more than ten distinct networks. Often, these networks may be bridged by one or more gateway devices, and increasingly, at least one module provides access to the Internet through one or more extra-vehicular networks such as Bluetooth, cellular 4G or 5G, and/or Dedicated Short-Range Communication (DSRC).

Notably, both the computing nodes and the network capability of the vehicles may be constrained due to power, cost, and other design requirements. The resulting system features low-clocked processors, limited memory, and low bandwidth. Worsening this problem is the long service life of vehicles—averaging 11.6 years in the United States, as of 2016—and the fact that vehicle hardware may potentially be rarely upgraded, and instead replaced only upon its failure.

Automotive Software and Data: Authenticity and Version Control

In vehicles, software may increasingly be used to control the performance of critical systems such as acceleration, braking, and steering. This software would benefit from performing hard-realtime tasks, degrading gracefully, and safely handling spurious data and service interruptions and it is therefore validated extensively throughout the development process. While software may initially be robust and bug-free, the late addition of vehicle differentiating features may introduce bugs or create unanticipated and untested use cases. To address these challenges, one or multiple compute modules can be updated with appropriate, authentic software to ensure that the entire vehicle electronic system is validated as being self-compatible.

It may be therefore beneficial to track software versions across in-vehicle modules to ensure software compatibility and therefore safety and performance. In some instances, the problem is not as simple as loading the latest version onto each module with every update—software may be configured differently based on the vehicle's options, with the resulting variant reflecting the availability of different sensors, actuators, and messages transiting across the various in-vehicle networks. Further complicating factors, even the same option codes may implement components from different production lots or even suppliers and therefore may benefit from different calibration or interface codes.

At the time of assembly, these parameters may be known and it may be straightforward to program the vehicle with a tested and approved software payload. There may be certain configurations allowable from the factory, and modules may be programmed at the time of assembly, with the manufacturer recording the hardware and software version to a database. In some examples, once deployed, and when bugs are identified or features are added, there may be three methods for software updates: dealership programming, over-the-air (OTA) updates, and do-it-yourself updates. These modalities can be more difficult to secure.

When a vehicle is brought in for service, critical updates may be downloaded to in-car modules using a specialized programming tool. The dealership or service center's programming tool often relies upon on-line software capable of querying the manufacturer's database of available software, and that database contains information about software's compatibility and interoperability with other software and hardware within the vehicle. Based on these data, the module's software may be updated at the same time as its dependencies, including software installed on other computing devices. The OEM and/or supplier may optionally record this programming event to a database along with the vehicle identification number, providing an auditable history of programming events.

However, not all service centers use this software, and as a result, manufacturers may not have full insight into the software version installed on individual vehicles. For example, some aftermarket programming tools may only update a single module without regard for vehicle options or software version interoperability. Complicating this further is the usage of Over-The-Air (OTA) updates, which can be used to improve security and to reduce service costs, but which may not necessarily check compatibility or provide confirmation of successful software installation. There is also a growing market for aftermarket software and hobbyist reprogramming ("car hacking") that manufacturers may be unable to track, as the OEM or supplier's online database may never be queried and the vehicle may not necessarily identify that a programming event has taken place, e.g. in the case diagnostic services are used to rewrite specific memory locations, rather than a wholesale code re-flashing event. Similarly, end-users may buy and install pre-programmed modules from scrapped vehicles or part houses assuming they are plug-and-play while in fact the software versions are incompatible, leading to safety concerns.

Despite these challenges, Original Equipment Manufacturers (OEMs) may have an obligation to maintain vehicle safety for the entire product lifecycle. Being able to accurately identify installed software and its provenance for all in-vehicle modules could reduce illegitimate warranty claims and limit liability exposure stemming from improper software configuration for manufacturers and their suppliers. Similar techniques could be used to identify whether a "variant configuration" (software-enabled features) has been changed by unauthorized users, or whether "immutable" parameters, like mileage, airbag status, service event history, or the Vehicle Identification Number (VIN), have been changed without authorization.

Various embodiments relate to automotive software provenance validation and assuring integrity of critical data for the incumbent and future vehicle fleet by creating a black box audit trail capable of monitoring data and software versions that is resistant to contemporary attack modes, including in-situ data modification, aftermarket software updates, and module swapping. Some embodiments include a lightweight and performant system which extends to a variety of use cases including validating critical actuator or sensor data or capturing context relating to accidents.

Embodiments Including a Master Computing Unit

Various embodiments include a distributed black box. In some embodiments, the distributed black box may include embedded devices which can self-identify a hash representing software and hardware metadata that may be uniquely-identifying. This may include (but is not limited to): design date, date and location of manufacture, version number, variant code, serial number, and/or VIN. The hash may be sent to a master computing unit with heightened capabilities. The master computing unit may be the infotainment system head unit of a vehicle. Many vehicles may already include the master computing unit and often runs embedded or full versions of consumer operating systems. The head unit or master computing unit can report the unique hashes externally for analysis in accordance with some embodiments of the invention. The hash identifier may be crucial considering each embedded device's maintenance requirements may be dependent on a combination of factors reflected in the metadata. For example, devices with the same software version may have different update requirements because of variations in so-called "identical" devices produced by different suppliers, or the same supplier in different lots. At all times, a running log of hash identifiers may be present in the vehicle that is held within the master computing unit.

In some embodiments, the communication integrity of the embedded system metadata may be critical, more so than the privacy of the data itself. If an attacker is able to change the log maintained of the embedded systems versions, it may be possible to introduce software incompatibilities that would result in unsafe operations. This challenge can be particularly significant for connected and automated vehicles, as their computational payload is more substantial than conventional vehicles, and their drive-by-wire capabilities may create a unique attack vector subject to compromise resulting from data modification or corruption not present in some human-operated vehicles. Even minor data alterations could cause an autonomous vehicle to be taken out of service, though the disclosed embodiments may be equally applicable to conventional, human-operated vehicles and their computing payloads. Also, providing a robust mechanism for reporting the time and state of software versions during reporting could be leveraged for other use cases using traceable, temporal histories, such as proving location.

Finally, the master computing unit that holds the version control information may communicate with other high-compute units and the OEM via wireless telemetry. Such communication could be direct from the master computing unit or indirect after traversing multiple trusted intermediaries over the network to reach the server. Here again, many contemporary vehicles directly link the master computing unit, such as an infotainment head unit, with a telemetry module capable of providing high-speed and low-latency extravehicular connectivity.

Embodiments Including a Layered Distributed Architecture

Disclosed herein is a layered distributed architecture that employs a distributed hash table (DHT) at the in-vehicle embedded system level that feeds into a blockchain light client to communicate externally to achieve the outlined objectives.

A distributed hash table may be a distributed ledger that can store and retrieve data efficiently using a key across a network of nodes. The key may be used as part of a key-value pair to associate data with a request. The data may be on any of multiple of several nodes. They key is how the data is located efficiently. No one node contains all of the system's data at a given time, therefore, it can be extremely memory efficient as compared with a blockchain. The DHT is a distributed data storage mechanism. The blockchain light client is a blockchain client with reduced features and capabilities than the blockchain full node stored The distributed black box may be distributed across various levels. Level 1 may include the vehicle's internal network which may include such components as the Engine Control Unit (ECU), Body Control Module (BCM), and Transmission Control Module (TCM). Level 2 may include the master computing unit which may be housed in the head unit of the vehicle. Level 3 may include the OEM server.

The embedded systems may host a DHT that can be distributed across the vehicle's internal network at Level 1. Because each node of the DHT may not hold the complete ledger which may be accessed by the OEM, each DHT node communicates with a single blockchain light client that may reside in the master computer unit at Level 2. The light client that operates over a blockchain (e.g., Ethereum) can serve as a central location within the vehicle for the otherwise distributed embedded system data to be collected. The light client subsequently reports the embedded system data to a designated full blockchain node housed by the vehicle's OEM server at Level 3.

Light clients in accordance with some embodiments of the invention can communicate this data at pre-defined intervals and/or at the time of an event (e.g. when a device is plugged into the OBD port, upon configuration changes, when Universal Diagnostic Services or J2534 initiates a memory-modification event or software reflash, at a set mileage or time interval, upon receipt of a digital service notice, etc.) using the in-vehicle eSIM and telemetry module, or during vehicle servicing when the programming device is directly connected to a wide-area network. The dual-use of in-car and service devices to update the master blockchain may help alleviate the challenge of home-service events going unrecorded. Each vehicle OEM may therefore track all of the light clients' data that is reported to their blockchain node so that they can monitor their vehicles for potential risks. This may address software validation during both over-the-air and service-center reprogramming events. The OEM would then be able to provide servicing companies insights about necessary updates for given vehicles in a fleet.

Figure 2:
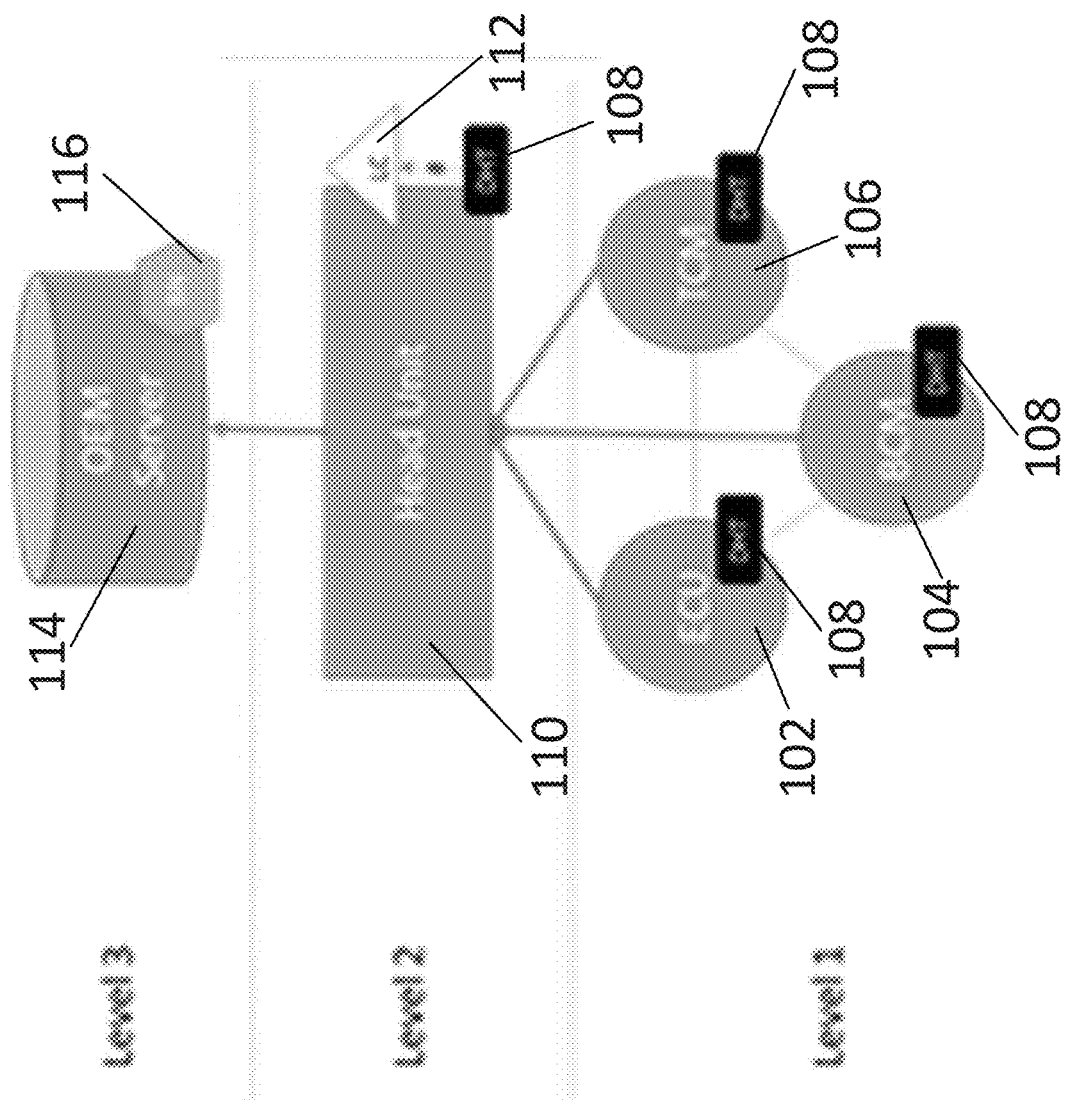
FIG. 2 illustrates a schematic for a distributed black box implemented in a vehicle in accordance with an embodiment of the invention.

FIG. 2 illustrates a schematic for a distributed black box implemented in a vehicle in accordance with an embodiment of the invention. The distributed black box includes a three-layered architecture blending a DHT implementation with a blockchain implementation, to gain the benefits of both technologies without imposing undue computational burden on constrained compute modules. Level 1 includes Engine Control Unit (ECU) 102, Body Control Module (BCM) 104, and Transmission Control Module (TCM) 106. The ECU 102, BCM 104, and TCM 106 each include a DHT 108. The ECU 102, BCM 104, and TCM 106 are in communication with a head unit 110. The head unit 110 includes a DHT 108 which communicates with a blockchain light client 112. The head unit 110 is in communication with an OEM Server 114 which includes a blockchain full node 116. The blockchain light client 112 passes information to the blockchain full node 116. The head unit 110 acts as a master computing node wherein the DHT 108 results can be meta-hashed onto the blockchain light client 112 and then hashed onto the blockchain full node 116.

At Level 1, multiple networked in-vehicle embedded devices such as the ECU 102, BCM 104, and TCM 106 can be responsible for generating a hash of the software version, date, and time at pre-determined intervals or events. The hash may not be limited to this use case and its associated data. The status of other security-relevant software components could also be collected such as the status of V2V authentication certificates. In some embodiments, this may be stored in a node of the DHT 108 which may reside on one of the embedded devices 102, 104, 106 in the vehicle. The DHT 108 may be connected to other embedded systems with their own DHT 108 within the vehicle's internal network.

In some embodiments, the DHT 108 may be used as data storage because of the distributed, redundant, and scalable features of the ledger. The DHT 108 does not have the same financial costs as using a public blockchain, nor does it require public internet access to use. The DHT 108 may require considerably less memory overhead than a blockchain node, where in some cases as little as 1-2 KB of ROM is needed at each node as compared with over 1 MB for even the smallest blockchain light clients.

Further, a user may retrieve the hash of any embedded device 102, 104, 106 on the vehicle given they have the public key to the hash table. The hash may be a unique configuration of the vehicle and thus the user can identify the configuration of the vehicle by retrieving the hash. The hash key may be computed from some irreversible combination of vehicle parameters to complicate deanonymization. In some embodiments, the key-generation may take as input a feature vector describing the serial numbers of each embedded device 102, 104, 106 in the vehicle, and the most-recent software version within the vehicle so that the key captures critical vehicle parameters, and still changes over time (to further mitigate the effects of key deanonymization). The user may therefore be able to determine their key through an associated mobile application provided by the OEM, or else generate it through a web interface by inputting their VIN and a unique passphrase provided by the OEM once the user's ownership has been validated, similar to the process for retrieving an immobilizer or key code. This approach reduces the potential for third-party access to sensitive data, and may serve to limit abuse.

One benefit of the above discussed approach is that if an embedded device 102, 104, 106 is unresponsive, the last known hash of the embedded device 102, 104, 106 can be checked from other DHT 108 participants. This is a benefit of DHT's 108 decentralized and fault tolerant nature. An additional benefit is that this approach can help alert an operator that a single module has been modified without consistency across the vehicle, e.g. that the odometer's mileage was changed in the engine controller but not the transmission controller. In such cases, discrepancies can be flagged using pre-defined logic or manually, through human-assisted inspection. Considering there may be hundreds of embedded devices 102, 104, 106 per vehicle, a DHT's 108 ability to scale efficiently may be valuable in assuring system integrity in such complicated and hyper-connected systems.

In Level 2, a local DHT 108 may be housed on the master computing unit 110, such as (but not limited to) the infotainment head unit. The master computing unit 110 may take a hash of the DHT 108—a meta hash of all software versions across the embedded devices 102, 104, 106 on the vehicle and hash this onto a blockchain light client 112 in regular intervals (while also storing a copy on the master computing unit 110). Upon capturing this meta hash, the DHT nodes 108 may erase their oldest stored values once a storage limit is reached, in order to preserve memory in the embedded devices 102, 104, 106. The number of values to store may be selected carefully to balance the memory consumption, hardware longevity, and data integrity of the system (e.g. storing more values may provide resilience in the case of data corruption within the master computer unit 110, but may be require costly onboard memory, while reducing storage saves cost, but frequent rewrites may compromise memory integrity as the hardware write-limit may be reached).

In some embodiments, the master computing unit 110 may have more memory and processing power than typical embedded systems in the vehicle to accommodate the blockchain light client 112. The master computing unit 110 of contemporary vehicles may have one or more high-power, high compute nodes bridging across intra- and extra-vehicular networks. These devices may have several megabytes or even gigabytes of RAM and ROM, as well as multi-core processors.

In some embodiments, the master computing unit 110 may feed the blockchain light client's 112 meta hash to the blockchain full node 116 designated for the blockchain light client 112. The blockchain full node 116 may be located on a OEM Server 114 at Level 3. The blockchain full node 116 may be run by the OEM Server 114 of the vehicle, or another fleet management or agency. Once the blockchain light client 112 delivers the meta-hash to the blockchain full node 116, a checksum may be conducted on the OEM Server 114. In some embodiments, the OEM Server 114 may have a library of meta-hashes that reflect acceptable and safe permutations of embedded software versions across all possible vehicle variants. If the vehicle's meta-hash fails the checksum, a notification may be sent to the vehicle service provider indicating service may be needed. Alternatively, an emergency over-the-air update could be delivered for all embedded software in the vehicle, or the vehicle could be immobilized until the software has been manually reinstalled. While the OEM Server 114 is illustrated as one device, it is understood that the OEM Server may be multiple servers.

A benefit of employing the blockchain once data is communicated over the open internet is the integrity afforded by a large, public blockchain like Ethereum, which may only be vulnerable to a 51% attack. A 51% attack can only occur if an attacker manipulated over 50% of the compute power of the blockchain and diverts the chain's direction by altering the values of the blocks for the majority of nodes. For large blockchains such as Ethereum or Bitcoin, this is extremely expensive and difficult to accomplish considering the amount of compute power behind the chain.

In some embodiments, it may be desirable to maintain a degree of redundancy within the system's data storage at the DHT 108, for example, in the case where connectivity is intermittent and data may not be uploaded to the blockchain at regular intervals. In such a scenario, corruption of one DHT 108 could result in loss of information to the blockchain light client 112 at the next upload event. Redundancy within the DHT 108 may potentially avoid this data loss, which may be beneficial in high-assurance software implementations. For example, if a node 102, 104, 106 or the master computing unit 110 is taken offline, redundancy allows for the data to be backed up in at least one other place. Thus, the node 102, 104, 106 or the master computing unit 110 may be replaced and the data for the distributed audit trail may be repopulated onto the new component. In some embodiments, the vehicle odometer may be high-assurance systems used for taxation and valuation purposes. Without redundancy, lost travel data could dramatically alter the value of a vehicle or change its warranty status. Having travel data in multiple nodes allows for the distance travelled to be measured accurately, even if one node is disconnected. In some instances, data loss could be determined by the master computing unit 110, or self-negotiated among the blockchain light client 112. The blockchain full node 116 will not pull or request data from the DHT 108, however the blockchain light client 112 will pull data from the DHT 108 and act as a conduit of information to the blockchain full node 116. In some embodiments, the blockchain light client 112 can determine if values are inconsistently coming from the DHT 108, it could request different values from the redundant source.

In some embodiments, clusters of redundant DHT nodes within the vehicle may be used to avoid DHT data loss or corruption. Rather than storing the full DHT 108 from information derived from a single client, multiple clients may be considered in aggregate to ensure data integrity. The number of DHT 108 may be determined as a function of memory, cost longevity, and resilience targets.

One implementation to maximize data resilience includes a parity system including at least two DHT nodes 108 with another parity node having equivalent data storage serving as a parity disk. The parity system may include a single bit change across a set of bits sums to a known value, e.g. with the sum of values across a given bit-location for all input disks summing to an even number. With such a system, rather than having every compute module capable of supporting a DHT node 108 operating independently, they would instead form meta-client clusters of three or more units with heightened resilience. That is, two of the three modules may be in agreement. Should any one node fail, the system may reconstruct lost or corrupted data on that one node. The node may be replaced and the data rewritten based on the parity information across the system. In this manner, disparities in values across devices may be detected and corrected, providing protection against data corruption or modification and reinforcing the layered and distributed nature of the presented black box architecture.

Figure 3:
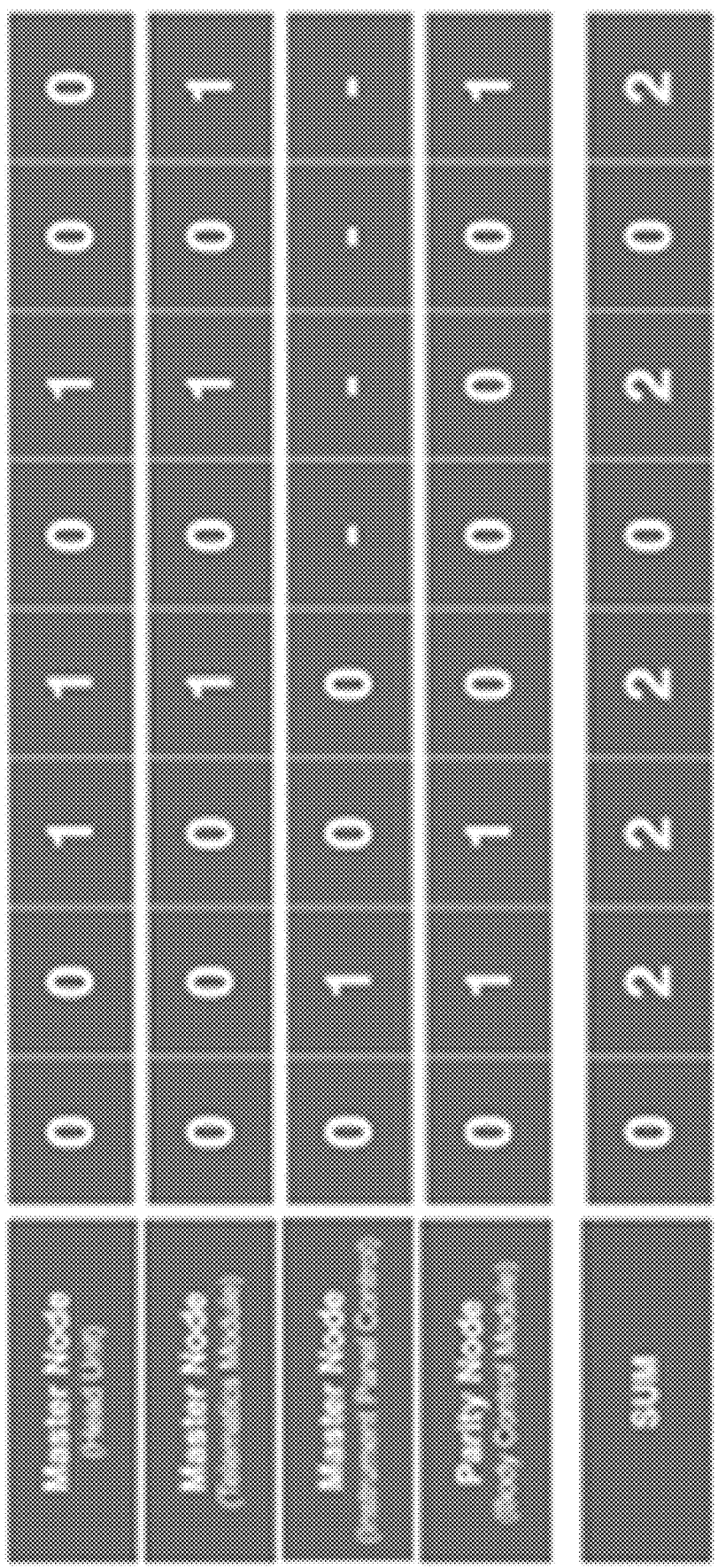
FIG. 3 illustrates a table describing an example parity system stores data across multiple storage devices in accordance with an embodiment of the invention.

A representative implementation of such a distributed parity system appears in FIG. 3. FIG. 3 illustrates a table describing an example parity system that stores data across multiple storage devices in accordance with an embodiment of the invention. Bits are added across devices and "checked" against a parity device. If there is a disparity between expected and actual values, any single device's memory can be reconstructed. Storage size may differ across devices, but the parity storage node would beneficially be the largest storage device in the system. This parity system may work with principals similarly to an unraid parity system which is described at /wiki.unraid.net/Parity which is incorporated by reference in its entirety. In this example, one device (e.g. the body control module) may serve as a parity node, which detects and corrects corruption in up to one other failed device at a time. It does this by tracking changes across all nodes in the network and summing over the memory in the same location for each, then adjusting the bit value in that location on the parity drive such that the sum total of the bits on all devices in the system is even (could also be odd in some implementations). In this manner, if a drive fails, the "missing bit" at each location may be reconstructed by finding the value (1 or 0) required to make the parity even (or odd). If the parity drive fails, that may be reconstructed by summing over all the bits in the non-parity devices and finding the value that makes the sum even (or odd) again. The example parity system is merely one example of a parity system. Other parity systems including one or more parity devices are contemplated as well such as parity nodes for each of the master nodes to separately backup each node.

In some embodiments, the systems described above may be implemented in a new vehicle. In some embodiments the systems described above may also be implemented on contemporary vehicle architectures including low-cost, constrained vehicle hardware. When implementing the system on an already-deployed vehicle, the hardware payload may include appropriate capabilities related to computation, data storage, and secure communications. Existing software may be redeveloped with safety and security implications considered and reevaluated (e.g. ISO26262 [7]).

Alternative Approaches

Embodiments disclosed above may include one or more of the following features 1) self-identification of software and hardware metadata hash identifiers to a master computing unit, 2) communication integrity of the embedded system metadata and 3) the master computing unit holding version control may communicate with other high-compute units over wireless telemetry. In some embodiments, a DHT/Blockchain hybrid in accordance with a variety of embodiments of the invention may include one or more of the following features: 1) the DHT nodes for each embedded system can be called by the light client stored in the master computing node for each vehicle; 2) the public blockchain's resilience to attack and manipulation through its decentralized, consensus-driven cryptographic hashing function provides integrity of the vehicle metadata that represents the aggregate of the embedded system software details; and 3) the security behind public blockchains such as Ethereum and its ability to withstand attacks is capable of providing communication with other high-compute units. Alternative approaches such as using exclusively DHT or blockchain may not provide all of the features discussed previously.

In some examples, a DHT-only solution would lack features 2 and 3. DHTs may be prone to a wide variety of attacks that could compromise the integrity of the data within. Even if additional integrity measures were applied, such as employing a Merkle-tree for hash verification, routing attacks may still be feasible. Instead, the security and tamper-proof benefits of the blockchain may be valuable once the data extends outside of the vehicle's intranet. Also, DHT may complicate feature 3. With DHT, data is distributed amongst associated peer nodes—no node holds the complete ledger—and therefore, because each DHT node only contains a portion of the routing table, the OEM server may need to contact multiple nodes in order to find the locations and values for the entire database. Considering the scale at which these auditing operations would occur, coalescing all the data on the blockchain simplifies the OEM server's data retrieval for their fleet. In some embodiments, each master computing unit can hold the complete DHT database so that the OEM could access all relevant vehicle data in the same location through a single address—rather than having to query all embedded devices individually. Therefore, while feature 3 is feasible to accomplish with DHT, it is highly inefficient.

A blockchain light client may be employed for each embedded device's reporting log. There may be many benefits of using a blockchain light client; blockchains have integral communications, may be fully distributed, and may offer data immutability. However, the blockchain alone would lack feature 1 discussed above. Because of the sheer memory space and compute power specifications, it may not be feasible for the edge embedded devices to host a blockchain node or even a blockchain light client that could deliver a hash identifier to another node. Even light client blockchain nodes may be around 1 MB in size and it may be infeasible that all contemporary and legacy in-vehicle embedded devices could host a node of such a size. In some embodiments, the embedded devices may have a constrained clock cycle, limited extra-vehicular bandwidth and RAM limitations. Further, many systems may be optimized for hard realtime applications and maximally utilize available resources, which would make employing blockchains for the embedded devices difficult.

To receive the benefit of immutability, an existing major blockchain such as Bitcoin or Ethereum may be used so that it is sufficiently large that an attacker would have trouble achieving a 51% attack, which is why a private blockchain that does not require a connection to the internet may be insufficient. Further complicating a blockchain-only approach, each embedded node may directly connect to the internet through hash values to a public blockchain (while private blockchains may be used, and may be preferred by some OEM servers, the use of public blockchains would enhance trust and potentially enable novel applications and data uses, e.g. by insurers, used vehicle certification services, or government agencies for VMT applications or law enforcement). This may come with additional compute and cost overhead that could make such an architecture operationally infeasible.

Together, a system employing a hybrid approach of use of DHT and Blockchain as described above may include all of the features described above. A hybrid approach of DHT and blockchain may provide a secure, scalable, and computationally-efficient record of software versions. Additional benefits of including the blockchain is that while the in-vehicle DHT may store the current software payload, the blockchain may provide a historical record of changes. This has the potential to be useful for insurers in accident reconstruction, Information Sharing and Analysis Center (ISAC) industry members that could benefit from understanding how an attack on vehicle data or software unfolded, or OEMs, in assessing warranty claims, among other applications.

Regular data uploads from a vehicle to an OEM Server may include privacy concerns. In some embodiments, the hybrid DHT/blockchain system may only report data related to vehicle configuration and operation, rather than directly related to user habits, and to do so in an anonymous manner, however such protections may not be enduring and sufficient to assure user privacy.

Enabled Capabilities

Embodiments including the hybrid DHT and blockchain light client implementation may enable a safer and more adaptable vision for future vehicle software assurance. As described, software version control may be primarily addressed, but also critical data such as vehicle identification or odometer data may be stored in a similar manner, updating the DHT and blockchain upon key event types. In some embodiments, the hybrid DHT and blockchain light client implementation may be used to assure the integrity of critical sensor or actuator data and commands.

This distributed black box system may allow OEM's and fleet managers to ensure that a vehicle is running the latest version of software from an approved vendor, that the hardware has been maintained appropriately, and that there have been no unauthorized modifications that could lead to inconsistencies or unanticipated/untested behavior. It also may ensure that vehicles are not reprogrammed to extend warranties, in fraudulent attempts to increase resale value, or to misrepresent vehicle options. For deployed vehicles, it increases the likelihood that OEMs and suppliers can identify vehicles subject to software or hardware recalls, and for insurers, to ensure that the software within the vehicle is authentic and has not been modified by a user, leading to its potential failure.

Additionally, the DHT may be used as one element in a larger system for ensuring the existence of a secure computing environment within the vehicle, by comparing the stored blocks to ensure that all of the components that are supposed to be present are there and have not been altered, and that historic events have not been tampered with. Validating data integrity, even weakly, may reduce the likelihood that modules can be added, removed, or replaced without proper authorization (e.g. a service event where the chains are told to expect new hardware on the next boot—protected by a secure, rolling and encrypted seed/key unlock to prevent EEPROM dump attacks), and helps to assure that critical data—such as the VIN, odometer, or crash history—have not been altered (since it may require compromising the majority of the chain at the same time). Disagreement could indicate probable tampering or fraud and set a flag across all modules that remain until being cleared by a proprietary tool. While compromising such a system may still be possible, it would take heightened effort relative to today's security implementations, and may serve as a deterrent from less determined adversaries.

Embodiments integrating the ledgers as a low-level security protocol (validating the presence of other modules and the contents of their chains at startup) may prevent incidents stemming from vehicle communication spoofing (e.g. taking a DSRC module from a scrapped car and moving it to an adversarial vehicle or standalone device to simulate congestion and unnecessarily cause traffic).

With a public ledger, it may be possible to identify when a vehicle's mileage is reset, or when the airbag light is turned off, or that a car did (not) have its recalled software updated or otherwise reconfigured. In some embodiments, it may be possible to see that modules have been replaced or reprogrammed, e.g. with one from a junkyard, enabling a smarter "CarFax" like service backed by authentic data from real vehicles.

This is of particular value to individuals and organizations concerned with temporal accountability, such as insurers, manufacturers, suppliers, lenders, and law enforcement agencies. As vehicle automation increases and manufacturer accountability grows, this approach can further support the creation of auditable records for vehicle use.

Implementing the distributed black box at scale can work with OEMs to update in-vehicle software to support the DHT and the blockchain light client, particularly in the incumbent fleet. It can also encourage the deployment and management of improved version control databases and enhanced testing of software and hardware compatibility.

Software is increasingly a competitive advantage differentiating vehicles within a segment. Implementing a DHT-blockchain hybrid within vehicles can allow OEM's to safely update in-vehicle software and ensure that vehicles are maintained appropriately over time, easing both the rollout of comfort and convenience features, but also the long-term deployment of high-automation and self-driving capabilities, without increasing liability exposure.

While some OEMs already update software over the air, and while some OEMs implement solutions such as Uptake and other PKI-based solutions to ensure that firmware payloads are secure, these OEMs may not take adequate measures to ensure that the appropriate software versions are installed to a vehicle and capable of interoperating with one another. The addition of a blockchain solution, updated upon hardware change events, has the potential to remove ambiguity and ensure that the right software is installed with respect to the vehicle's hardware payload and aggregate set of software variants. Without a fully-updated blockchain, traditional update approaches may fail—e.g. in the case that a hardware module was replaced by a repair shop or end-user without notifying the OEM of the change. Such an update could result in bricking the vehicle, or, the vehicle may operate normally until some edge case not tested for that particular variant is encountered. The ability to safely update software and ensure system level compatibility may also enable long-term annuity models for revenue capable of augmenting time-of-sale and traditional service models. The disclosed distributed black box system may be beneficial in helping transition towards highly-automated vehicles and growing the role of shared mobility services.

Additional Features

Vehicle computation may get faster and networks may grow more complicated with the advent of highly automated and increasingly connected fleets. Modules within the vehicles may increasingly gain compute capability including more and faster cores. Networks—both in-vehicle and extravehicular—may continue to gain capacity and latency may drop, ROM and RAM may increase, and software complexity may continue to grow as critical functions are further relegated to computer-control and additional comfort-and-convenience features are added at time of sale and in aftersale operations. These advances may be especially prevalent in shared mobility vehicles, for which the initial costs may be higher as they are not borne as directly by occupants.

As highly-performant vehicles gain market share and older vehicles atrophy and are removed from the operational fleet, the capabilities of the vehicular ledgers may continue to advance which may support more resilient implementations and broader applications for authenticated in-car data, including generating data useful for high-criticality network-wide fleet optimization.

Various embodiments of the disclosed automotive software solution may be extended to map not only vehicle software version, configuration, and changes, but other parameters as well—for example to validate that the tires were changed at a particular time by a particular vendor, or that the air filter was replaced when required by the onboard diagnostic system. Many embodiments may include a blockchain dedicated to monitoring wholesale vehicle maintenance and operations.

Such embodiments may reduce risk exposure across all elements of the product life cycle, which may ensure reliable data, reduce warranty costs by minimizing false claims and authenticate systems at the time of manufacturing, use and service. Some embodiments may have the hybrid DHT/blockchain system at each wheel encoder which may ensure that odometer increments as may be based on vehicle motion patterns which may enable more accurate Vehicle Miles Travelled (VMT) tax or Usage Based Insurance (UBI). Some embodiments may provide "Proof of Location" for connected vehicles, where vehicles generate a reliable history of location over time to prove that they were (not) present in a particular location, and to bear witness to (and provide data about) traffic incidents, road conditions and weather events.

As the automotive industry continues moving towards high automation and full self-driving, it may be advantageous to increase reliability of the embedded systems, their data and software. Cyber-physical systems with the disclosed distributed black box audit trail system may provide operational transparency and integrity which may help to assure users and OEMs that systems are operating as intended.

Realizing the full potential of highly-automated systems and their associated adoption may benefit from human trust in their operations. As part of building trust, such systems may benefit from monitoring and maintenance for safety and security. Just as there were risks associated with civil aviation when first introduced to the public, the closely managed governance processes, which included the introduction of Flight Data Recorders, facilitated their wide acceptance. Similar to civil aviation, the highly-automated vehicle may benefit from processes, procedures and technology that assure the public of their reliability. Embodiments discloses herein of the black box audit trail may be one such technology. The connectivity and associated security concerns of highly-automated systems may benefit from a design differing from traditional Flight Data Recorders. Disclosed embodiments of the distributed black box system may be layered, resilient, and robust approaches to assuring the integrity of connected and automated vehicles and other autonomous systems. Implemented properly, these systems may enable high assurance systems and improve auditability for OEMs, suppliers, vehicle operators, and other stakeholders and may contribute to the safe, large-scale adoption of next-generation automotive technologies.

While this disclosure has been provided in the context of a vehicle other cases have also been contemplated. For example, the system can be used anywhere data integrity matters, but notably, where data-in-context is beneficial. Data-in-context can protect and assure data integrity in systems which benefit from transparency and explainability, such as within the AI or control systems behind self-driving vehicles, aircraft control, or other judgement-making systems like CCTV facial recognition. The system may be specifically useful for use cases comprising a system of systems, where visibility for the components of the overall system may be generally non-transparent. Specific use cases can include—but are not limited to—self-driving and connected vehicles, smart cities (where components may be traffic signals, street lights, security cameras, etc.), smart homes, smart and connected factories, intelligent infrastructure (bridges, tunnels), smart grid and other connected utilities made up of many component parts that interoperate. The system may provide a secure mechanism to provide contextual data to help explain various decision system actions.

Connected System Including Satellites

Figure 4:
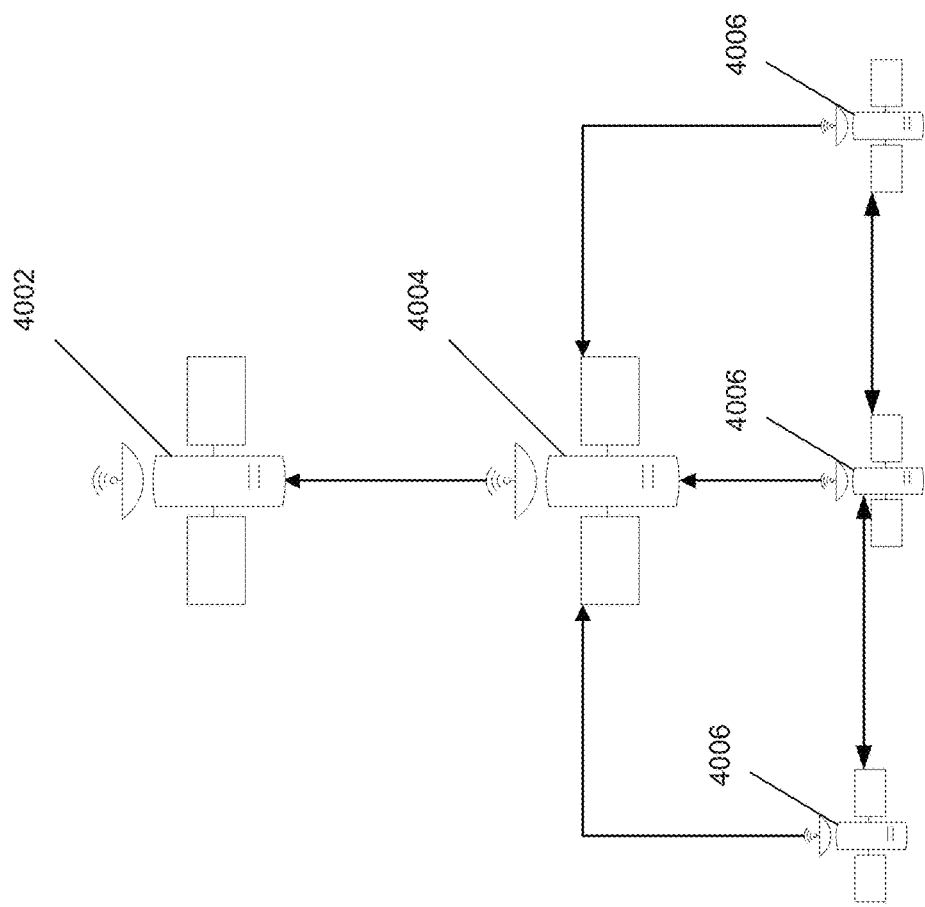
FIG. 4 illustrates a constellation of satellites implementing the distributed audit trail in accordance with an embodiment of the invention.

In some embodiments, the connected system may be a constellation of satellites. The master unit may be a main satellite whereas other sub-satellites may be the nodes. FIG. 4 illustrates a constellation of satellites implementing the distributed audit trail in accordance with an embodiment of the invention. A main satellite 4004 including software executable to create a blockchain light client and a DHT. The main satellite 4004 may also include software executable to control various aspects within the main satellite 4004. The main satellite 4004 may communicate with a plurality of sub-satellites 4006 which each form a node such that a first sub-satellite acts as a first node and a second sub-satellite acts as a second node. The first sub-satellite includes software executable to control aspects of the first sub-satellite and the second sub-satellite includes software executable to control aspects of the second sub-satellite. As illustrated, the plurality of sub-satellites 4006 may also include a third sub-satellite which may act as a third node. In some embodiments, the plurality of sub-satellites 4006 may include more or less sub-satellites. The main satellite 4004 communicates with a remote satellite 4002.

The remote satellite 4002 may include one or more processors and memory with programming executable to form a blockchain full node. The remote satellite 4002 may communicate wirelessly with the main satellite 4004. The master satellite 4004 and the plurality of sub-satellites 4006 may electronically communicate with each other through the DHT in order to form a combined audit trail. The master satellite 4004 further includes programming executable to create a meta-hash of at least one of the software version of the software in the master satellite 4004 and the plurality of sub-satellites 4006, satellite constellation identification data, satellite constellation sensor data, or satellite constellation configuration. The master satellite 4004 through the blockchain light client delivers the meta-hash to the blockchain full node in the remote servers 4002. The memory of the remote satellite 4002 further includes programming which performs a check of the meta-hash which compares the meta-hash to a stored library of acceptable and safe meta-hashes.

Figure 5:
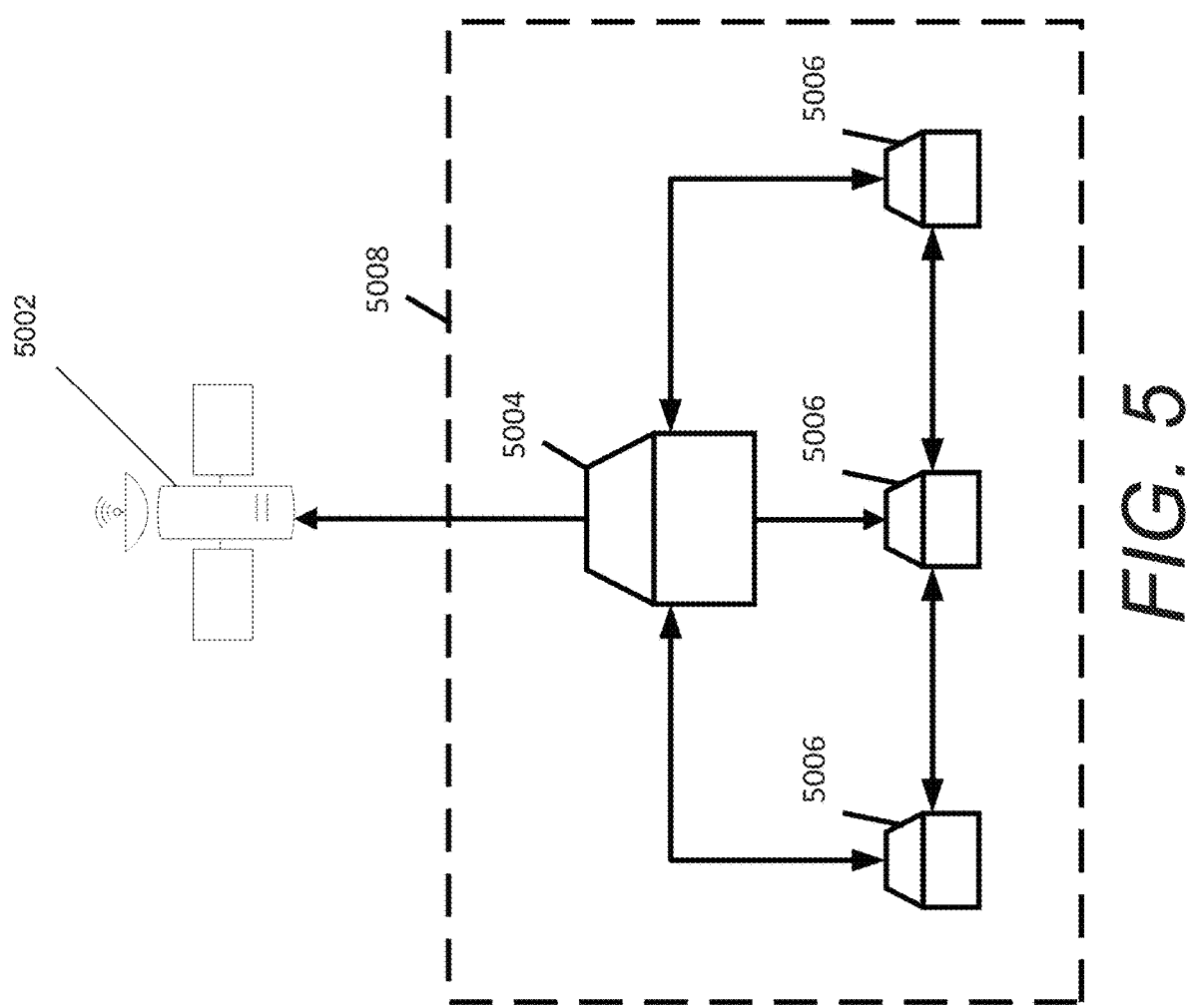
FIG. 5 illustrates a system including a single satellite implementing the distributed audit trail in accordance with an embodiment of the invention.

In some embodiments, the connected system may include various sub-systems within a single satellite. The master unit may be a main system of the satellite whereas the nodes may be various auxiliary systems within the satellite. FIG. 5 illustrates a system including a single satellite implementing the distributed audit trail in accordance with an embodiment of the invention. The single satellite 5008 includes a main system 5004 which includes software executable to create a blockchain light client and a DHT. The main system 5004 may also include software executable to control a first aspect within the satellite 5008. The main system 5004 may communicate with a plurality of sub-systems 5006 which each form a node such that a first sub-system acts as a first node and a second sub-system acts as a second node. The first sub-system includes software executable to control a second aspect of the satellite 5008 and the second sub-system includes software executable to control a second aspect of the satellite 5008. As illustrated, the plurality of sub-systems 5006 may also include a third sub-system which may act as a third node. In some embodiments, the plurality of sub-systems 5006 may include more or less sub-systems. The main system 5004 may communicate with a remote satellite 5002.

The remote satellite 5002 may include one or more processors and memory with programming executable to form a blockchain full node. The remote satellite 5002 may communicate wirelessly with the main system 5004. The main system 5004 and the plurality of sub-systems 5006 may electronically communicate with each other through the DHT in order to form a combined audit trail. The main system 5004 further includes programming executable to create a meta-hash of at least one of the software version of the software in the main system 5004 and the plurality of sub-systems 5006, satellite constellation identification data, satellite constellation sensor data, or satellite constellation configuration. The main system 5004 through the blockchain light client delivers the meta-hash to the blockchain full node in the remote satellite 5002. The memory of the remote satellite 5002 further includes programming which performs a check of the meta-hash which compares the meta-hash to a stored library of acceptable and safe meta-hashes.

While embodiments have been described with the DHT formed based on various sub-satellites (See FIG. 4) and the DHT formed based on various sub-systems within a single satellite (See FIG. 5). It has been contemplated that the DHT may be spread onto a combination of various sub-satellites and/or various sub-systems within a single satellite. Further, the master computing unit may reside on a different satellite or a sub-system of a single satellite which also houses sub-systems used as nodes.

Master Unit

The master unit may include memory with programming configured to control a first aspect of a connected system and also programming executable to create a blockchain light client and a distributed hash table.

Figure 6:
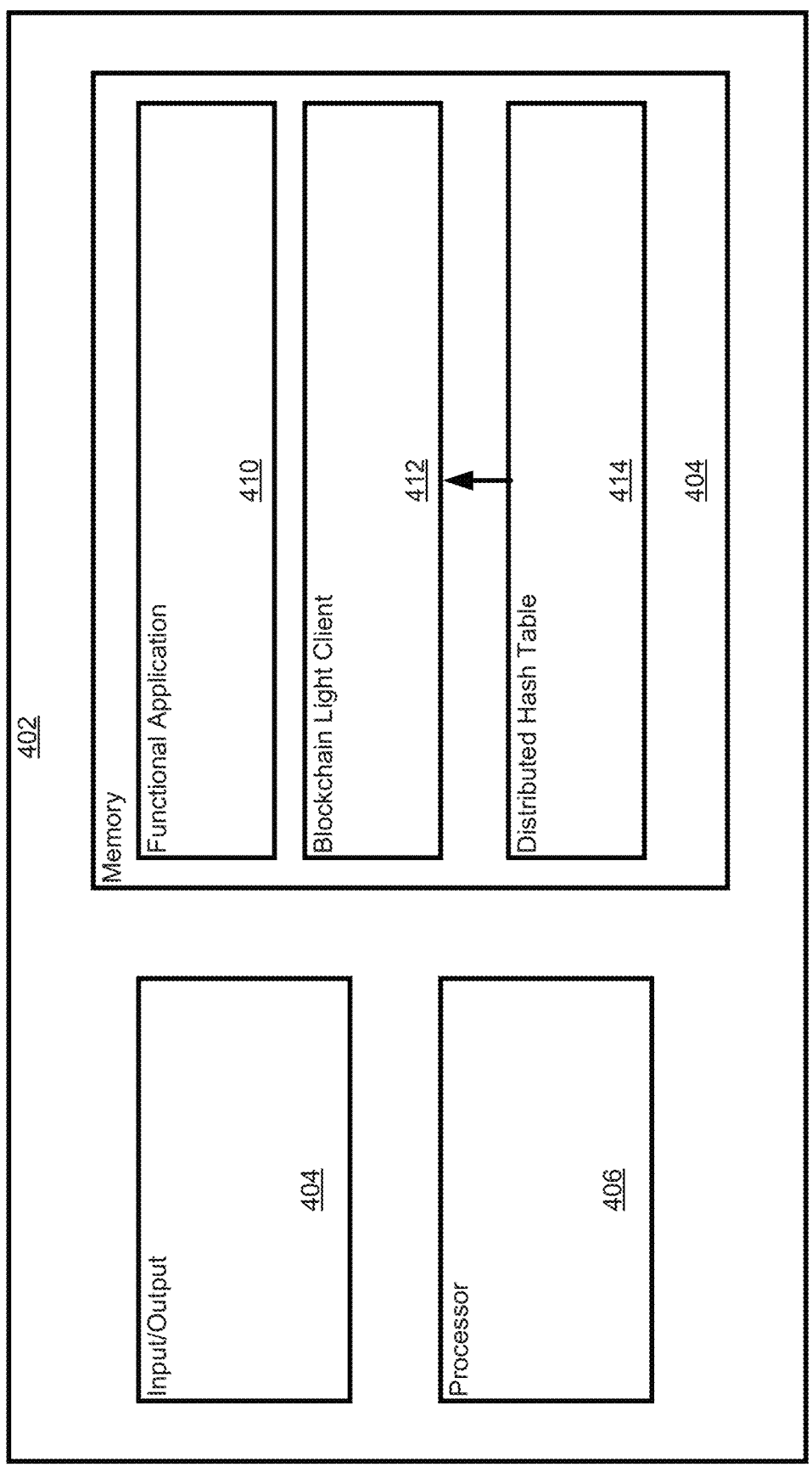
FIG. 6 illustrates a block diagram of a master unit in accordance with an embodiment of the invention.

FIG. 6 illustrates a block diagram of a master unit in accordance with an embodiment of the invention. As illustrated, the master unit 402 may include an input/output 404 which may be used to communicate with other components such as the first node and the second node. Further, the input/output 404 may be used to communicate with one or more servers over the internet as illustrated in FIG. 1. The master unit 402 further includes a processor 406 and memory 408 with programming executable by the processor 406. The memory 408 may include a functional application 410 which may be used to control a first aspect of the connected system. The memory 408 may also include a blockchain light client 412. The blockchain light client 412 may communicate with the blockchain full node on the one or more servers through the input/output 404. The memory 408 may also include a distributed hash table 414. The master unit 402, the first node, and the second node may communicate electronically thorough the distributed hash table 414 to form a combined audit trail.

Figure 7:
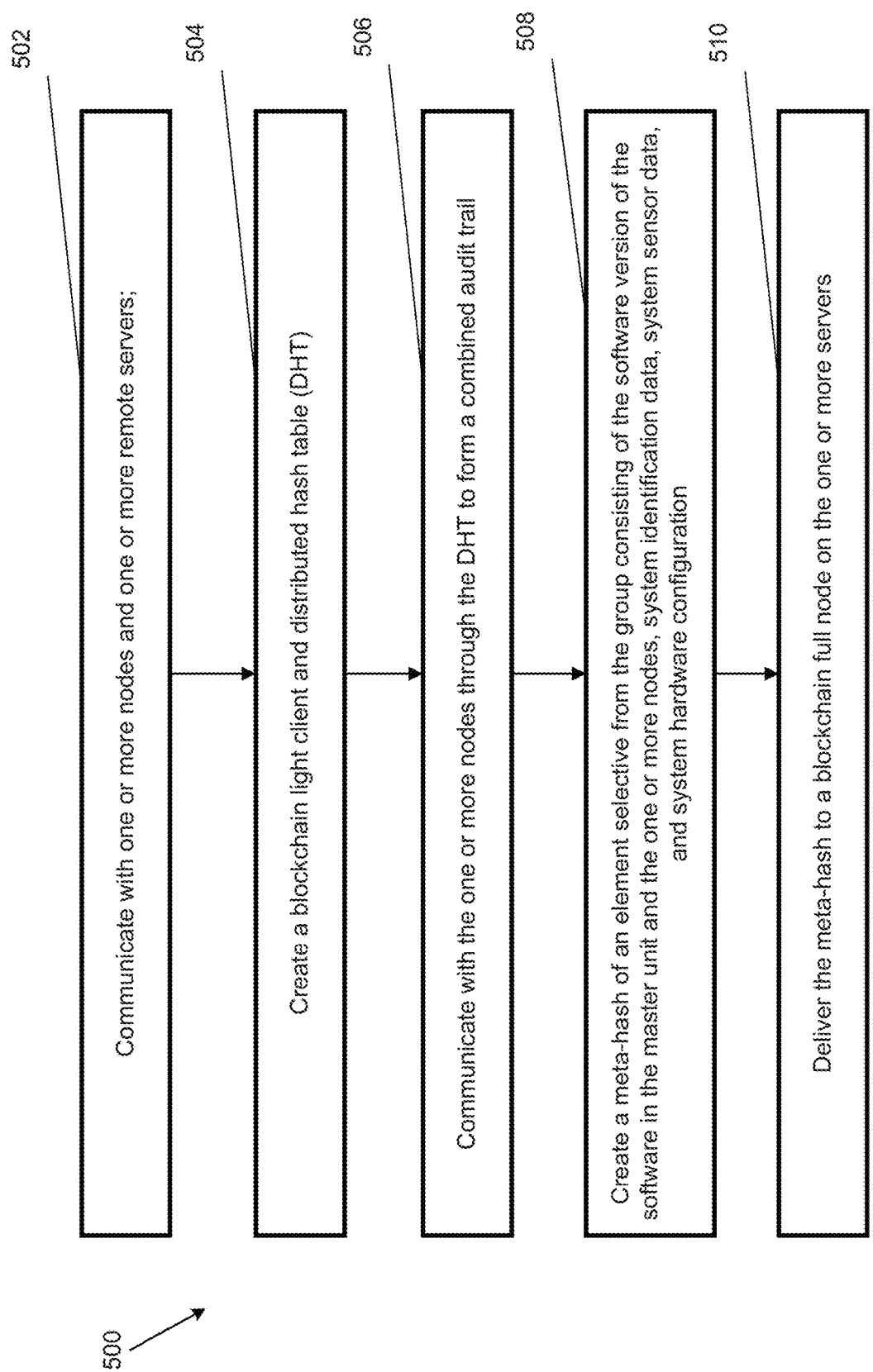
FIG. 7 illustrates a flowchart of a method of operating a master unit to create a distributed audit trail system for use in a connected system in accordance with an embodiment of the invention.

FIG. 7 illustrates a flowchart of a method of operating a master unit to create a distributed audit trail system for use in a connected system in accordance with an embodiment of the invention. The method 500 includes communicating (502) with one or more nodes and one or more remote servers. The one or more nodes may include a first node and a second node. The master unit may communicate with the one or more remote servers through the internet. The method 500 includes creating (504) a blockchain light client and a DHT. The blockchain light client communicates with the blockchain full node on the one or more remote servers. The blockchain light client and the blockchain full node may both verify data integrity. The blockchain light client may have fewer features which allows the blockchain light client to run on a master unit with less computing power or memory. The blockchain light client may run on lower cost master units and utilize less power than the blockchain full node. The blockchain full node may be involved in more transactions. Example functionality of the blockchain full node that is not present on the blockchain light client is orchestrating transactions and staking.

The method 500 includes communicating (506) with the one or more nodes through the DHT to form a combined audit trail. The DHT may be a decentralized storage system where information is stored on a network of peer nodes. Thus, the DHT in each node and the master unit does not include a full copy of the audit trail but instead the DHT stored within the one or more nodes and the master unit combine to form the complete audit trail. Whereas, the blockchain light client is a centralized repository holding a complete copy of the audit trail for a given system. The blockchain light client is updated with information from the DHT to create an immutable copy of the audit trail.

In some embodiments, the blockchain light client may invoke a curl function at pre-determined intervals to collect data from the DHT. The blockchain light client may push updates to the full blockchain node over an Ethereum network once the blockchain light client's storage is full (depending on the size of the storage capacity of the system that the blockchain light client resides on). Thus, the blockchain light client may run on a master unit with a limited amount of memory and push older audit trail details to the blockchain full node which may store a full copy of the audit trail.

The method 500 includes creating (508) a meta-hash of the software version of the software in the master unit and the one or more nodes, system identification data, system sensor data, and system hardware configuration. The meta-hash is a unique hash which represents the current configuration of the components of the connected system.

The method 500 includes delivering (510) the meta-hash to a blockchain full node on the one or more servers. The one or more servers may check the meta-hash against acceptable and safe meta-hashes to determine whether the current configuration of the components of the connected system are acceptable and safe.

Example Node

The connected system includes one or more nodes. Each node is configured to control a different aspect of the connected system and electronically communicate with the master unit to form a combined audit trail.

Figure 8:
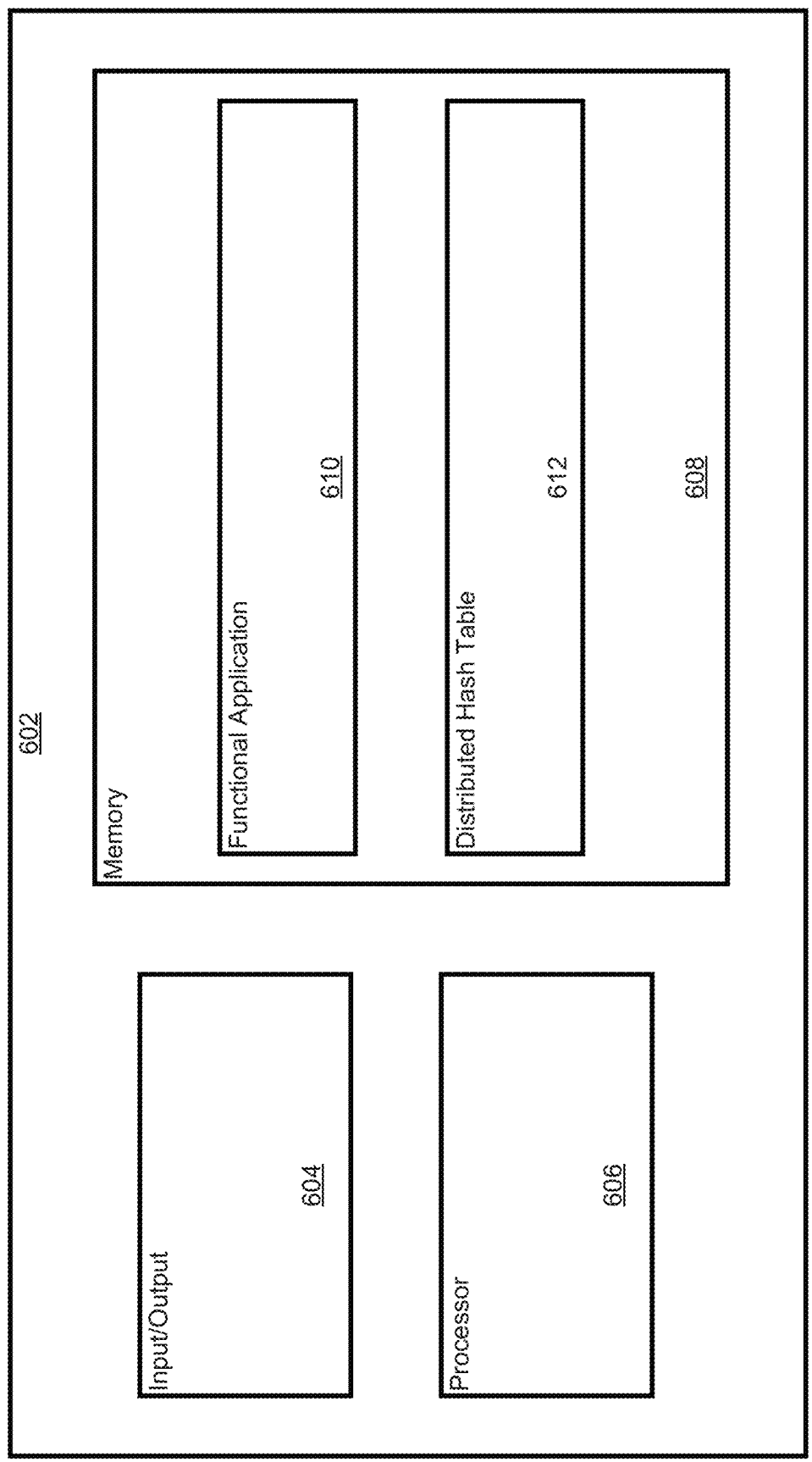
FIG. 8 illustrates a block diagram of an example node in accordance with an embodiment of the invention.

FIG. 8 illustrates a block diagram of an example node in accordance with an embodiment of the invention. As illustrated, the node 602 may include an input/output 604 which may be used to communicate with other components such as the master unit. The node 602 may also communicate with other nodes in the connected system. The node 602 further includes a processor 606 and memory 608 with programming executable by the processor 606. The memory 608 may include a functional application 610 which may be used to control an aspect of the connected system. For example, the functional application 610 of a first node may control a second aspect of the connected system whereas the functional application 610 of a second node may control a third aspect of the connected system. The memory 408 may also include a distributed hash table 612. The master unit and one or more nodes 602 may communicate electronically thorough the distributed hash table 612 to form a combined audit trail.

Doctrine of Equivalents

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A distributed audit trail system for use in a connected system comprising:
    a master unit comprising a master processor and a master memory with programming executable by the master processor to:
        control a first aspect of a connected system, wherein the connected system corresponds to a vehicle that houses the master unit and a plurality of independent nodes;
        create:
            a meta-hash corresponding to a system-operating element, wherein:
                the system-operating element is selected from the group consisting of respective software versions used in each of the master unit and the plurality of independent nodes; vehicle identification data; vehicle sensor data; and a vehicle hardware configuration; and
                the meta-hash is a unique hash identifying a state of the system-operating element:
            a blockchain light client; and
            a first portion of a distributed hash table (DHT) that is stored by the master unit; and
        deliver the meta-hash to a blockchain full node through the blockchain light client;
    a first node of the plurality of independent nodes, comprising a first node processor and a first node memory with programming executable by the first node processor to control a second aspect of the connected system, and create and store a second portion of the DHT;
    a second node of the plurality of independent nodes, comprising a second node processor and a second node memory with programming executable by the second node processor to control a third aspect of the connected system, and create and store a third portion of the DHT, wherein the master unit, the first node, and the second node:
        electronically communicate with each other to form the DHT in order to create a combined audit trail; and
        each comprise a system component selected from the group consisting of an infotainment system, an engine control unit, a body control module, and a transmission control module; and
    one or more remote servers, each including a server processor and a server memory with programming executable to:
        form the blockchain full node; and
        perform a check of the meta-hash, which compares the meta-hash to a stored library of safe meta-hashes, wherein, the check not identifying the meta-hash in the stored library of safe meta-hashes indicates an error with a source of the system-operating element corresponding to the meta-hash.

2. The distributed audit trail system of claim 1, wherein the server memory further includes programming executable to perform, when the check indicates a mismatch between the meta-hash and the stored library of safe meta-hashes, at least one action selected from the group consisting of:
    sending a notification to a service provider;
    performing an over-the-air update to a system software; and
    immobilizing the connected system until the system software is manually reinstalled.

3. The distributed audit trail system of claim 1, further comprising a third node, comprising a third node processor and a third node memory with programming executable by the third node processor to control a fourth aspect of the connected system wherein the third node electronically communicates with the master unit through the DHT in order to create the combined audit trail.

4. The distributed audit trail system of claim 1, further comprising a parity node, comprising a parity processor and a parity memory with programming executable by the parity processor to partially replicate respective portions of the DHT stored in each of the master unit, the first node, and the second node.

5. The distributed audit trail system of claim 4, wherein the parity node comprises at least one additional system component selected from the group consisting of the infotainment system, the engine control unit, the body control module, and the transmission control module.

6. The distributed audit trail system of claim 4, wherein the master unit, the first node, the second node, and the parity node collectively make up a parity system configured to detect and correct corruption in case at least one of the master unit, the first node, the second node, or the parity node fails.

7. The distributed audit trail system of claim 6, wherein various subsets of portions of the DHT within at least one the master unit, the first node, the second node, or the parity node are duplicated within at least one other of the master unit, the first node, the second node, or the parity node.

8. The distributed audit trail system of claim 1, wherein the master unit is a master infotainment system.

9. A method of operating a master unit to create a distributed audit trail system for use in a connected system, the method comprising:
    communicating with a plurality of independent nodes and one or more remote servers to control a connected system corresponding to a vehicle that houses the master unit and the plurality of independent nodes;

creating:
  a blockchain light client; and
  a distributed hash table (DHT) with a first node and a second node of the plurality of independent nodes, wherein the first node, the second node, and the master unit each:
    store a portion of the DHT; and
    comprise a system component selected from the group consisting of an infotainment system, an engine control unit, a body control module, and a transmission control module;
  communicating with the first node and the second node to form the DHT to create a combined audit trail;
  creating a meta-hash corresponding to a system-operating element selected from the group consisting of respective software versions used in each of the master unit and the plurality of independent nodes; vehicle data; vehicle sensor data; and a vehicle hardware configuration, wherein:
    the meta-hash is a unique hash identifying a state of the system-operating element; and
    a check of the meta-hash indicating a mismatch compared to a stored library of safe meta-hashes indicates an error with a source of the system-operating element corresponding to the meta-hash; and
  delivering the meta-hash to a blockchain full node on the one or more remote servers.

10. The method of claim 9, further comprising receiving an indication of the mismatch between the meta-hash and a library of safe meta-hashes.

11. The method of claim 10, further comprising, in response to the indication of the mismatch, receiving an over-the-air update to particular software in at least one of the master unit, the first node, or the second node.

12. The method of claim 10, further comprising, in response to the indication of the mismatch, immobilizing the connected system.

13. The method of claim 9, further comprising communicating with a third node through the DHT to create the combined audit trail.

14. The method of claim 9, wherein the master unit controls a first aspect of the connected system, the first node controls a second aspect of the connected system, and the second node controls a third aspect of the connected system.

15. The method of claim 9, further comprising communicating with a parity node configured to partially replicate respective portions of the DHT stored in the master unit, the first node, and the second node.

16. The method of claim 15, wherein the parity node comprises at least one additional system component selected from the group consisting of the infotainment system, the engine control unit, the body control module, and the transmission control module.

17. The method of claim 16, wherein the master unit, the first node, the second node, and the parity node collectively make up a parity system configured to detect and correct corruption in case at least one of the master unit, the first node, the second node, or the parity node fails.

18. The method of claim 16, wherein various subsets of portions of the DHT within at least one the master unit, the first node, the second node, or the parity node are duplicated within at least one other of the master unit, the first node, the second node, or the parity node.

* * * * *